S. E. NORMAN.
GARDENING IMPLEMENT.
APPLICATION FILED SEPT. 23, 1909.
978,478.
Patented Dec. 13, 1910.
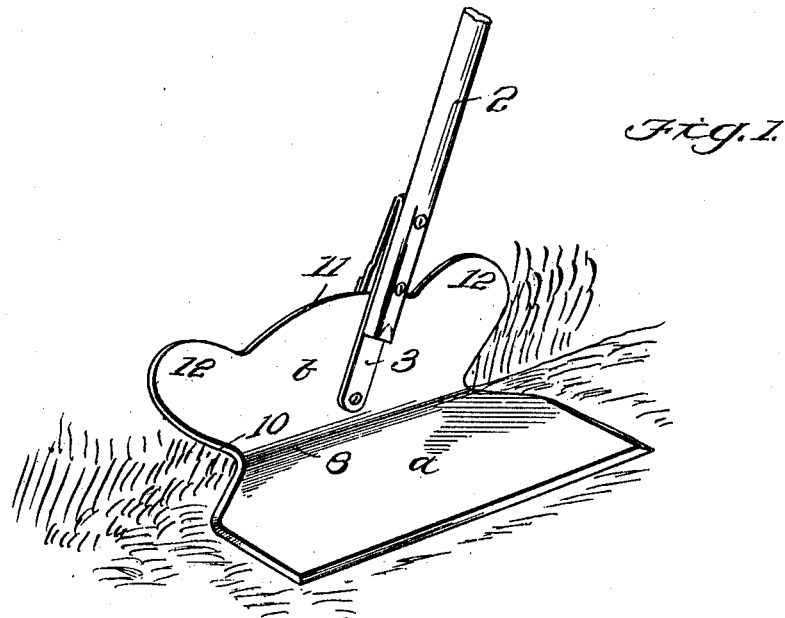
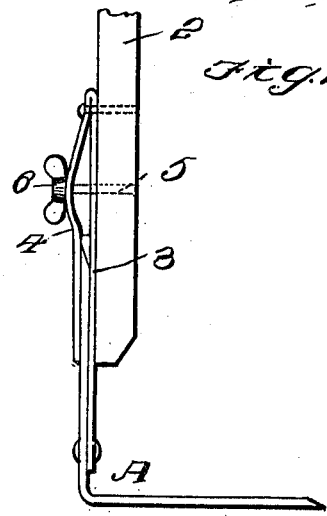
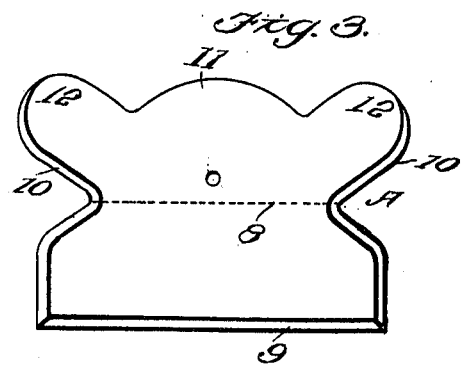
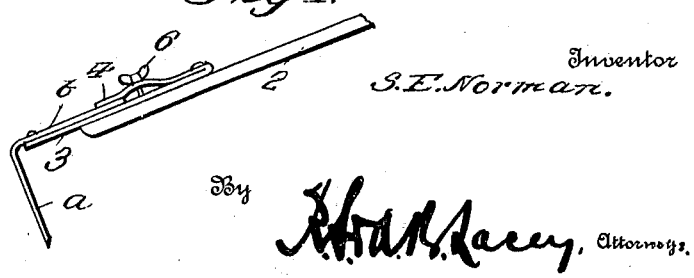
Witnesses
Inventor
S. E. Norman.
By Lacey, Attorneys

UNITED STATES PATENT OFFICE.

STERLING E. NORMAN, OF ATTLEBORO, MASSACHUSETTS.

GARDENING IMPLEMENT.

978,478.  Specification of Letters Patent.  Patented Dec. 13, 1910.

Application filed September 23, 1909. Serial No. 519,245.

*To all whom it may concern:*

Be it known that I, STERLING E. NORMAN, citizen of the United States, residing at Attleboro, in the county of Bristol and State of Massachusetts, have invented certain new and useful Improvements in Gardening Implements, of which the following is a specification.

My invention relates to implements used for gardening, and is in the nature of a combined sod-cutter and pole, the object of the invention being to provide an implement adapted to be moved along a grass border or along the margin of a driveway and cut the sod projecting thereover along the border, thus trimming the border.

A further object is to provide a device which will not only cut the overhanging portion of the sod, but will also undercut this overhanging portion so that the cut sod may be very easily removed.

Still another object is to provide a device of this character, which is adapted to be used either upon the right or left hand, and a still further object is to provide a sod cutter combined with a hoe or scraper, said scraper having a flat or hoe-like blade and opposed angular cutting blades adapted for various gardening uses.

The invention consists in the arrangement of parts and details of construction as will be hereafter stated, and as is shown in the accompanying drawings, wherein:

Figure 1 is a perspective view of my improved implement; Fig. 2 is an edge view of the same; Fig. 3 is a plan view of the blank; and, Fig. 4 is an edge view showing the implement used as a scraper or hoe.

Corresponding and like parts are referred to in the following description and indicated in all the views of the drawings by the same reference characters.

Referring to the figures, 2 designates a stock forming a handle which, at its lower end, is provided with a flat clamping bar 3 which projects beyond the lower end of the stock. The upper end of the clamping bar 3 is returned upon itself, as at 4, and extended to a point coincident with the lower end of the stock, thus forming a clamping jaw. A bolt 5 passes through the lower end of the stock 2 and through the two thicknesses of the bar 3 and carries the clamp nut 6. This nut is preferably formed with a wing whereby it may be easily turned. Any other form of clamping nut, however, may be used.

The blade A of my improved implement is made from a blank shown in Fig. 3 and is bent on the line 8 to form the two portions $a$ and $b$. The edge of the portion $a$ is straight, as at 9, and the ends of the blade are cut away, as at 10, so as to form angular cutting edges upon the ends of the upwardly and outwardly extending portions $a$ and $b$. The side edge of the portion $b$ is arcuate, as at 11, this arcuate margin projecting beneath the extended end of the clamp plate 4 and being adapted to be clamped when the plate is forced downward by means of a nut and bolt 5 and 6. The arcuate edge 11 is located intermediate of the ends of the portion $b$ and thus two wings 12 are formed, which act as stops for limiting the angular relation of the handle to the blade. The cutting edges extend across the ends of both the portions $a$ and $b$, and thus it will be seen that the angular blade has a cutting edge 9 along one side and a cutting edge at both ends. Because of the cutaway portion 10, the cutting edges at the junction of the two portions of the blade are diagonal and give a sheer cut.

This implement is designed to be used in trimming the borders of lawns, around drives, walks and beds. The handle is adapted to be set in opposed angular positions against either wing 12, and by placing the handle in either of these angular positions and pulling or pushing the tool along the border, as much of the sod can be cut away by the edges 10 as is needed to trim up the edge of the drive, walk or border, while at the same time, the portion $a$ of the blade which lies flat upon the ground or driveway, will undercut the strip of sod divided by the portion $b$, and undercut it loose from the bottom, thus leaving it in such shape that it can be easily removed. By moving the handle of the implement to a middle position, as shown in Fig. 4, the tool may be used as a scraper or hoe, and the material cut in the first instance, removed from the edge of the border, ready to be carried away.

It is usually necessary in cutting the borders of driveways, beds, etc., to use a spade to cut the border upon a line. The cutter or spade is then laid aside and the hoe is used to loosen the divided portion of the sod from the ground and scrape it up. My improved tool not only puts a sod cutter and a hoe or scraper on one handle, but provides an implement much more efficient for the purpose than the usual articles. As a sod cutter and trimmer the tool not only cuts vertically and separates the overhanging sod from the bed or margin of the driveway, but also makes the bottom cut, separating the divided sod from the ground, at one operation. It is therefore very much quicker in operation than other implements for this purpose. Furthermore, as a hoe, the implement has the advantage that the overhanging portion *b* of the blade prevents dirt and sod from spilling over the top of the blade. The capability of the handle to be moved into the two opposed angular positions also adapts the implement for working on either side of a bed or border and in either direction. Still another advantage of my invention lies in the fact that in cultivating soil close to the border of a lawn, the loose dirt is worked away from the grass instead of toward it. Furthermore, the implement, on account of its narrowing width, is adapted to follow between closely set shrubs or plants. Again, by using the tool with the portions *a* and *b* both extending upward and the corner of the blade against the ground, the implement is adapted for use in cutting small drains or in clearing said drains, for the reason that the angular blade being cut away at 10 is therefore provided with the two inclined cutting edges 10 extending in planes right angles to each other.

While I have shown certain details of construction which I believe to be preferable and thoroughly effective in use, I do not wish to limit myself to said details, inasmuch as the tool may be embodied in many ways, without departing from the spirit of my invention.

Having thus described the invention, what I claim is:—

1. An implement of the character described having a blade angular in section formed with reëntrant cutting edges at opposite ends, and a handle pivoted to one flange of the angular blade for movement across the face thereof.

2. In an implement of the character described, a blade having a vertical portion, and a horizontal portion, said blade being formed at opposite ends at the junction of the two portions, with reëntrant cutting edges.

3. An implement of the character described, having an angular blade, the ends of said blade, at the angle thereof, being cut away to form opposed inwardly extending cutting edges, a handle pivoted to one flange of the blade for movement across the face thereof, and means for holding the handle set in any adjusted position.

4. An implement of the character described, having an angular blade formed with opposed inwardly extending cutting edges at its ends, one flange of the blade having an arcuate side edge, and a handle pivoted to said flange for movement across the face thereof, and having a clamp engaging with the arcuate margin of the blade to hold the handle set in any adjusted position.

5. An implement of the character described, having an angular blade formed with cutting edges at its ends, one flange of said blade having an arcuate side edge, a handle pivoted to said flange, a clamping bar attached to the handle and extending down below the arcuate edge of the blade upon the outside thereof, and a clamp bolt passing through the handle and clamping bar.

6. An implement of the character described having an angular blade, one flange of the blade, intermediate of its ends being arcuate, the ends of said flange extending outward and forming stops, a handle pivoted to said flange for movement across the face of the same, said movement being limited by said stops, both flanges of the blade, at the ends, being cut inward and toward the angular corner of the blade to form opposed inwardly extending cutting edges.

7. An implement of the character described, having an angular blade formed with cutting edges at its ends, a handle, a bar attached to the handle and projecting at one end below the handle and pivoted to one flange of the blade, said bar, at its upper end, being returned upon itself and extending downward below the handle to form a clamp plate engaged upon the outer face of said flange, and a clamp bolt and nut passing through the handle and the clamp plate for locking the handle in any desired angular relation to the blade.

In testimony whereof I affix my signature in presence of two witnesses.

STERLING E. NORMAN. [L. S.]

Witnesses:
W. N. WOODSON,
F. B. WRIGHT.